Aug. 14, 1945.   J. C. OWENS   2,382,500
ANTISIPHON BALL COCK VALVE
Filed Sept. 11, 1943
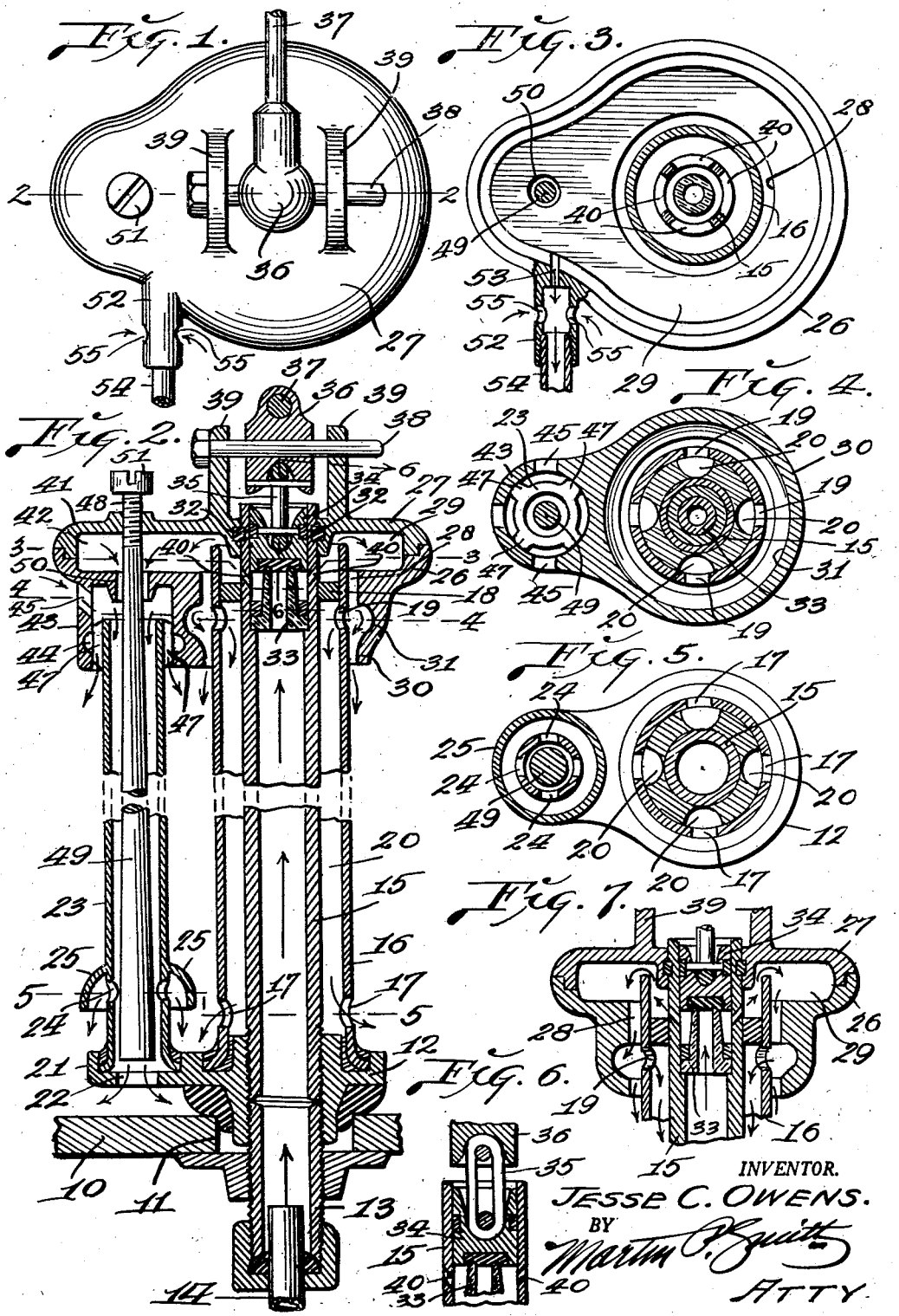
INVENTOR.
JESSE C. OWENS.
BY
ATTY.

Patented Aug. 14, 1945

2,382,500

UNITED STATES PATENT OFFICE 2,382,500

ANTISIPHON BALL COCK VALVE

Jesse C. Owens, Los Angeles, Calif.

Application September 11, 1943, Serial No. 501,943

9 Claims. (Cl. 137—104)

My invention relates to new and useful improvements in anti-siphon ball cock valves of the general types shown in U. S. Letters Patent No. 2,290,145 issued to me, July 14, 1942, also patent application filed by Loren E. Criss and myself June 27, 1942, Serial No. 448,796, which issued as Patent Number 2,329,337, Sept. 14, 1943, and the co-pending applications filed by me as follows: Serial No. 466,001 filed November 18, 1942; Serial No. 478,381 filed March 8, 1943; and Serial No. 497,602 filed August 6, 1943.

Among the principal objects of my present invention are, to generally improve upon and simplify the constructions set forth in the above identified patents and co-pending patent applications, to provide a ball cock which is practically noiseless in operation, capable of effecting a rapid dispersion of the water passing through the valve during a flushing function and to effectively counteract and break any siphonic conditions which tend to draw contaminated water from the bowl and tank backwardly into the water supply line.

Further objects of my invention are, to provide a ball cock having a wide range of adjustability, capable of being readily assembled and installed and which will not tend to clog as a result of dirt, sand and sediment carried by the water passing through the valve.

A further object of my invention is, to provide a ball cock wherein practically all of the structural parts may be advantageously made from plastics, thus providing a light-weight, strong and durable structure which is rust proof and not subject to corrosion.

With the foregoing and other objects in view, my invention consists in certain novel features of construction and arrangement of parts which will be hereinafter more fully described and illustrated in the accompanying drawing in which:

Fig. 1 is a top plan view of my improved ball cock.

Fig. 2 is a vertical section taken on the line 2—2 of Fig. 1.

Fig. 3 is a horizontal section taken on the line 3—3 of Fig. 2.

Fig. 4 is a horizontal section taken on the line 4—4 of Fig. 2.

Fig. 5 is a horizontal section taken on the line 5—5 of Fig. 2.

Fig. 6 is a detail section taken on the line 6—6 of Fig. 2.

Fig. 7 is a vertical cross section taken through the center of a modified form of the ball cock.

Referring by numerals to the accompanying drawing, which illustrates a preferred embodiment of my invention, 10 designates the bottom of a toilet flush tank having an opening 11 for a base fitting 12 and for a nipple 13 which connects the water supply duct 14 to said fitting.

Screw seated in fitting 12 in vertical alignment with nipple 13 is the lower end of a pipe 15 which extends upwardly within the tank and this pipe, together with a slightly larger pipe 16 concentrically disposed about said pipe 15, provide a support for the valve housing hereinafter more fully described.

The lower end of pipe 16, which functions as a hush tube, is rigidly secured in any suitable manner to base 12 with water outlet and air inlet apertures 17 formed in the wall of said pipe 16, just above said base and arranged between and secured by cement, acetone or the like, to the pipes 15 and 16 just below their upper ends, is a ring 18.

Formed in the wall of pipe 16 just below ring 18 are water inlet apertures 19.

The annular space between the walls of pipes 15 and 16, with the exception of vertical ducts 20, is filled with plastics or suitable self-hardening cement and the upper and lower ends of these ducts communicate respectively with the apertures 19 and 17.

Rigidly secured to a lateral extension 21 of base 12, directly over an opening 22 in said extension, is the lower end of a vertical pipe 23, open at both ends and formed through the wall of said pipe, a short distance above its lower end, are water outlet apertures 24 over which are positioned hoods or deflectors 25 open at their lower ends.

The valve housing carried by the upper ends of pipes 15 and 16 comprises a lower part 26 and upper part 27 and when the valve is assembled, the meeting edges of the two parts are permanently fastened by acetone, cement or, if the housing is formed of metal, by welding.

Lower part 26 is provided with an opening 28 slightly larger than pipe 16 and the upper end of said pipe projects through this opening and terminates in a chamber 29 between the housing parts.

Depending from the underside of housing part around opening 28, is an integral skirt 30 and formed in the inner face thereof, in horizontal alignment with apertures 19, is an annular groove 31. The inner face of skirt 30 below groove 31 inclines inwardly, so as to deflect water from said groove toward the surface of pipe 16.

The upper end of pipe 15 extends through an opening formed in upper housing part 27 and is rigidly secured to said upper part in any suitable manner, preferably by means of a ring 32 of self-hardening material such as plastics or cement. If desired, pipe 15 may be screwseated in the upper part 27 and which arrangement simplifies the assembly or disassembly of the parts.

Seated in the upper portion of pipe 15 is a nozzle 33, the upper end of which provides a seat for a piston valve 34 which is arranged for sliding movement in the upper portion of pipe 15.

A link 35 pivotally connects valve 34 to a head 36, to which a float-carrying arm 37 is connected and said head being pivoted on a pin 38 seated in brackets 39 on top of upper housing member 27 (see Figs. 2 and 6).

The construction just described is very similar to a corresponding arrangement disclosed in my aforesaid co-pending patent application filed November 18, 1942, Serial No. 466,001, with the link 35, in the present case, taking the place of a toggle pin in said co-pending application.

Formed through the wall of pipe 15 just below the upper end of nozzle 33 and above ring 18, are upwardly inclined slots 40 which, when valve 34 is lifted from its seat, permit water to discharge from pipe 15 upwardly, out through the open, upper end of pipe 16 into chamber 29.

The housing composed of parts 27 and 28 has a short, lateral extension 41, having a chamber 42 common to chamber 29 and depending from said extension is a skirt 43, in the inner face of which, near its lower edge, is formed an annular groove 44.

Formed through the wall of skirt 43 above groove 44 is a series of air inlet apertures 45 and concentrically arranged within said skirt is the open, upper end of pipe 23.

Spacing ribs 47 formed integral with the upper portion of pipe 23 are secured by cement or acetone to the inner face of skirt 43 and said ribs pass vertically across groove 44.

The threaded portion 48 of a rod 49 is screw seated in that portion of the housing above chamber 42 and said rod, which gradually increases in diameter, extends downwardly through an aperture 50 in the housing below chamber 41, thence downwardly through pipe 23 to a point near the bottom thereof, just above outlet aperture 22 in extension 21.

A head 51 on the upper end of this tapered rod enables same to be rotated and at the same time to be raised or lowered, thereby adjusting the position of said rod relative to the surrounding pipe 23 and outlet 22.

Projecting laterally from housing 41 is a short tubular stem 52 with a jet opening 53 leading from chamber 41 into said stem and connected to the outer end of the latter is a refill tube 54.

Air inlet openings 55 are formed through the wall of stem 52 at right angles to the travel of the jet of water from opening 53 to the refill tube (see Fig. 3).

When a bowl flushing function takes place, the float carried by arm 37 lowers within the tank thereby swinging head 36 on its axis and through link 35, valve 34 is lifted from its seat thus permitting water under pressure to discharge from pipe 15 through nozzle 33 and through the upwardly inclined slots 40 into chambers 29 and 42 in the valve housing. A portion of this water passes through opening 28 into groove 31, which functions as an expansion chamber, thence downwardly over the surface of tube 16 and at the same time part of the water from groove 31 passes through apertures 19, thence downward through ducts 20 and finally out through apertures 17 into the tank to replace the water discharged therefrom during the flushing function.

The water from chamber 41 flows downwardly through aperture 50 and then divides with a part flowing downwardly through tube 23 around rod 49, while the other part flows downwardly between the ribs 47 over the outer surface of tube 23. During this latter action, groove 44 functions as an expansion chamber.

A certain amount of the water flowing downward through tube passes out through apertures 24 and this discharge, as well as the discharge of water through aperture 22, may be regulated by raising or lowering the tapered rod 49.

The structure and functions just described provide for a very rapid dissemination of water entering and passing through the valve and eliminate practically all noises which ordinarily attend flushing operations.

The rapid and practically unrestricted flow of water from the chambers 29 and 41 is effective in decreasing the tendency of the ports and ducts to become clogged by sand, dirt and the like and if, under abnormal conditions, any clogging should occur, the housing comprising parts 27 and 28 may be readily removed from the upper end of pipe 15, thus permitting ready access to all parts of the valve for cleansing purposes.

By constructing the main parts of the valve from plastics or the like, deterioration, as a result of rust and corrosion, is eliminated.

The sucking of contaminated water from the bowl through the valve into the supply line, as a result of siphonic conditions, is prevented by the admission of air into the valve, through apertures 45, 24, 22, 17, 28 and 55.

In Fig. 7 I have shown a modified structure wherein the main housing comprising the parts 27 and 28 are devoid of the lateral extension 41, the tube 23 and the adjustable, tapered rod 49.

Thus it will be seen that I have provided an anti-siphonic ball cock valve which is simple in structure, inexpensive of manufacture and very effective in performing the functions for which it is intended.

It will be understood that minor changes in the size, form and construction of the various parts of my improved anti-siphonic ball cock valve, may be made and substituted for those herein shown and described without departing from the spirit of my invention, the scope of which is set forth in the appended claims.

I claim as my invention:

1. The combination with a flush tank water supply pipe, of a housing mounted on said supply pipe, a hush tube concentrically disposed about said supply pipe, the open upper end of which hush tube communicates with the chamber in said housing and is spaced apart from the walls thereof to form an outlet opening, said supply pipe being provided with outlet ports which communicate with the chamber in the housing, float controlled valvular means for controlling the flow of water from said supply pipe to said outlet ports, means below said outlet ports for closing the annular chamber between said supply pipe and hush tube and there being apertures formed in the wall of the hush tube below said annular chamber closing means.

2. The combination with a flush tank water supply pipe, of a housing mounted on said supply pipe, a hush tube concentrically disposed about said supply pipe, the open upper end of which hush tube communicates with the chamber in said housing and is spaced apart from the walls thereof to form an outlet opening, said supply pipe being provided with outlet ports which communicate with the chamber in the housing, float controlled valvular means for controlling the flow of water from said supply pipe to said outlet ports, a skirt depending from said housing around said hush tube and which skirt is provided on its inner surface with an annular groove.

3. The combination with a flush tank water supply pipe, of a housing mounted on said supply pipe, a hush tube concentrically disposed about said supply pipe, the open upper end of which hush tube communicates with the chamber in said housing and is spaced apart from the walls thereof to form an outlet opening, said supply pipe being provided with outlet ports which communicate with the chamber in the housing, float controlled valvular means for controlling the flow of water from said supply pipe to said inlet ports, a skirt depending from said housing around said hush tube, which skirt is provided on its inner surface with an annular groove and there being apertures formed in said hush tube opposite said annular groove.

4. The combination with a flush tank water supply pipe, of a housing mounted on said supply pipe, a hush tube concentrically disposed about said supply pipe, the open upper end of which tube communicates with the chamber in said housing and is spaced apart from the walls thereof to form an outlet opening, said supply pipe being provided with outlet ports which communicate with the chamber in the housing, float controlled valvular means for controlling the flow of water from said supply pipe to said outlet ports, said housing having a second outlet opening in its bottom, a skirt surrounding said second opening and an open ended tube having its upper end positioned within and spaced apart from the wall of said skirt, there being an annular groove formed on the inner face of said skirt below the upper end of said open ended tube.

5. The combination with a flush tank water supply pipe, of a housing mounted on said supply pipe, a hush tube concentrically disposed about said supply pipe, the open upper end of which hush tube communicates with the chamber in said housing and is spaced apart from the walls thereof to form an outlet opening, said supply pipe being provided with outlet ports which communicate with the chamber in the housing, float controlled valvular means for controlling the flow of water from said supply pipe to said outlet ports, said housing having a lateral extension with an opening in its bottom, a perforated skirt surrounding said last mentioned opening and there being air inlet openings formed through the wall of said skirt.

6. The combination with a flush tank water supply pipe, of a housing mounted on said supply pipe, a hush tube concentrically disposed about said supply pipe, the open upper end of which hush tube communicates with the chamber in said housing and is spaced apart from the walls thereof to form an outlet opening, said supply pipe being provided with outlet ports which communicate with the chamber in the housing, float controlled valvular means for controlling the flow of water from said supply pipe to said outlet ports, said housing having a lateral extension with an opening in its bottom, a perforated skirt surrounding said last mentioned opening and a supported tube having its upper portion positioned within and spaced apart from said skirt and from the opening in the bottom of the housing.

7. The combination with a flush tank water supply pipe, of a housing mounted on said supply pipe, a hush tube concentrically disposed about said supply pipe, the open upper end of which hush tube communicates with the chamber in said housing and is spaced apart from the walls thereof to form an outlet opening, said supply pipe being provided with outlet ports which communicate with the chamber in the housing, float controlled valvular means for controlling the flow of water from said supply pipe to said outlet ports, said housing having a lateral extension with an opening in its bottom, a perforated skirt surrounding said last mentioned opening, a supported open-ended tube having its upper portion positioned within and spaced apart from said skirt and from the opening in the bottom of said housing and means for regulating the flow of water through said tube.

8. The combination with a flush tank water supply pipe, of a housing mounted on said supply pipe, a hush tube concentrically disposed about said supply pipe, the open upper end of which tube communicates with the chamber to said housing and is spaced apart from the walls thereof to form an outlet opening, said supply pipe being provided with outlet ports which communicate with the chamber of the housing, float controlled valvular means for controlling the flow of water from said supply pipe to said outlet ports, said housing having a lateral extension with an opening in its bottom, a perforated skirt surrounding said last mentioned opening, a supported open-ended tube having its upper portion positioned within and spaced apart from said skirt and from the opening in the bottom of said housing and said tube being provided near its lower end with combined water outlet and air inlet openings.

9. In an anti-siphon ball cock valve a flush tank water supply pipe, a housing mounted on said supply pipe, float actuated valvular means for controlling the flow of water from said supply pipe into and through said housing, a hush tube disposed about and spaced apart from said supply pipe, means whereby water from the housing is caused to flow downwardly through and around said hush tube, an open-ended tube leading downward from said housing, the upper end of said last mentioned tube having communication with the chamber in the housing and means for causing water from the housing to discharge downwardly through and around said last mentioned tube.

JESSE C. OWENS.